(12) United States Patent
Noritake

(10) Patent No.: US 6,647,740 B2
(45) Date of Patent: Nov. 18, 2003

(54) REFRIGERATOR DAMPER APPARATUS AND REFRIGERATOR

(75) Inventor: Seiichiro Noritake, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 10/107,600

(22) Filed: Mar. 25, 2002

(65) Prior Publication Data
US 2002/0139135 A1 Oct. 3, 2002

(30) Foreign Application Priority Data
Mar. 30, 2001 (JP) .......................... 2001-098593

(51) Int. Cl.[7] .............................................. F25D 17/04
(52) U.S. Cl. .......................................... 62/408; 62/186
(58) Field of Search ........................ 62/408, 256, 418, 62/407, 255, 186; 454/347, 352, 358, 361

(56) References Cited

U.S. PATENT DOCUMENTS

| 3,214,099 A | | 10/1965 | Capps |
| 4,216,822 A | * | 8/1980 | Izumi .......................... 165/42 |
| 4,498,528 A | | 2/1985 | Jacquet |
| 5,464,370 A | | 11/1995 | Shimizu et al. |
| 5,765,388 A | | 6/1998 | Jeon |
| 5,826,441 A | | 10/1998 | Oh |
| 5,875,642 A | | 3/1999 | Lee et al. |

FOREIGN PATENT DOCUMENTS

GB  2208427  3/1989

* cited by examiner

Primary Examiner—Chen Wen Jiang
(74) Attorney, Agent, or Firm—Hogan & Hartson, LLP

(57) ABSTRACT

A damper apparatus for a refrigerator includes a single damper open/close plate in which two faces of the damper open/close plate are capable of facing two duct opening sections that are branched from one duct. Each of the two faces of the open/close plate opens and closes each of the corresponding opening sections that face the respective two faces of the open/close plate.

15 Claims, 3 Drawing Sheets

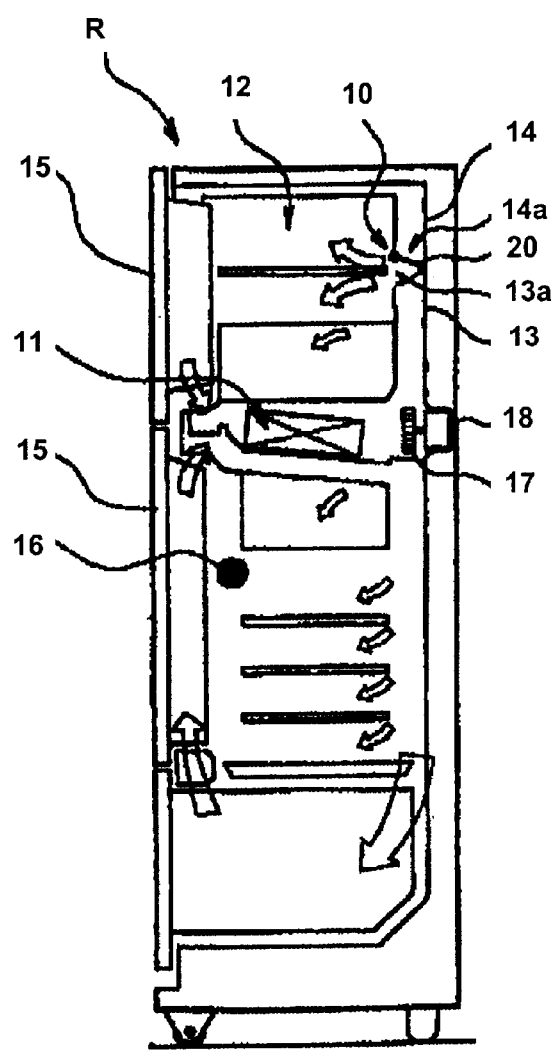
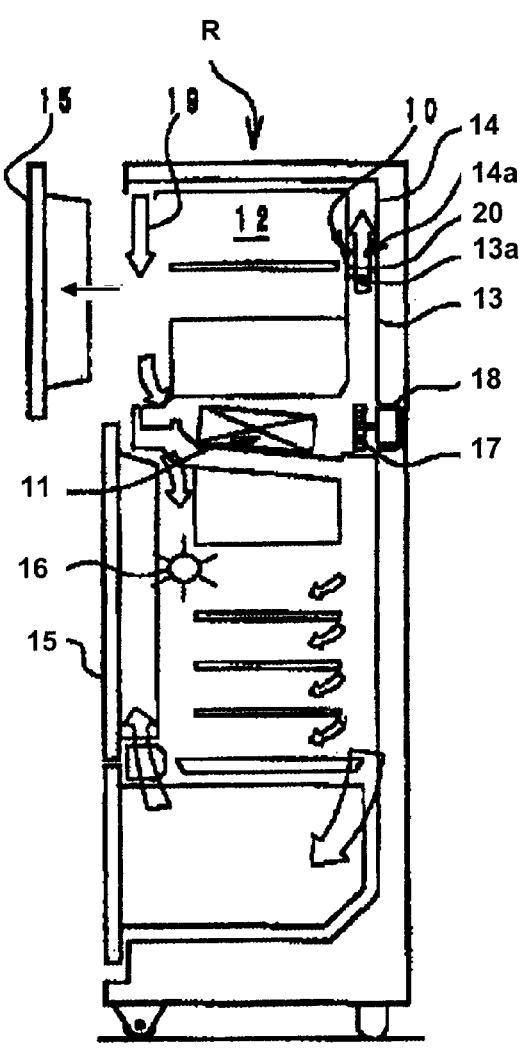
Fig. 1 (a)
Fig. 1 (b)

REFRIGERATOR DAMPER APPARATUS AND REFRIGERATOR

BACKGROUND OF THE INVENTION

1. Field of the Invention

The present invention relates to a damper apparatus that is disposed in a refrigerator, and more particularly to controlling cooling airflow within a refrigerator.

2. Description of Related Art

In general, a damper apparatus provided in a refrigerator is used to open and close an opening section provided in a duct that is connected from a cooler to a freezer chamber to thereby adjust the temperature inside the refrigerator. More specifically, the temperature in the freezer chamber is always monitored by a temperature sensor, and is controlled by a microcomputer. When the detected temperature of the sensor lowers and becomes lower than a specified set value of the microcomputer, the damper apparatus is energized to close the opening section by a damper open/close plate, and the energization is shut off at a state in which the damper is closed. Conversely, when the temperature within the refrigerator rises and exceeds the set value, the damper apparatus is energized again, and the energization is shut off at a position when the damper open/close plate is completely opened.

Normally, when the refrigerator access door is closed, the fan inside the refrigerator is stopped as a noise prevention countermeasure. As a result, warm air from outside may readily enter the refrigerator, and therefore the temperature and humidity inside the refrigerator may increase. As the humidity enters the cooler section, it causes dew condensation and frosting, which hinders the cooling ability of the refrigerator, and therefore wastes the power.

As a countermeasure, the damper apparatus is energized in association with an opening movement of the access door to operate the damper open/close plate in a direction in which the duct is closed. This can prevent due condensation inside the duct that may take place as warm air enters the cooler system. In the mean time, an air curtain apparatus may be provided to form a plane layer of flowing air across the entire surface of the opening section at the access door. The air curtain will prevent external air from readily entering the refrigerator to raise the temperature inside the refrigerator.

This temperature increase inside the refrigerator, which may be resulted from opening the access door, is caused not only by the open air entering the refrigerator, but also by heat of a lighting apparatus provided inside the refrigerator that lights up only when the access door is opened. This temperature increase by the heat of the lighting apparatus also needs to be lowered by blowing cooling air inside the refrigerator. Accordingly, to cope with at least the above two factors of the temperature increase caused by opening the access door, a duct that conducts cooling air from the cooler and a damper apparatus that controls air flow depending of the requirement are required.

In other words, one twin type damper apparatus having two dampers or two single type damper apparatuses may be required as a structure that can simultaneously control a damper circuit that closes a duct that connects to the cooler on one hand, and another damper circuit that provides communication with the cooler on the other hand. The damper apparatus uses motors as its power source, and the motors are provided inside the refrigerator. Therefore, as the number of motors inside the refrigerator increases, the heat generated by the motors lowers the cooling efficiency, and the power consumption increases.

SUMMARY OF THE INVENTION

It is an object of the present invention to reduce the number of damper apparatuses to be installed in a refrigerator, and to provide a damper apparatus that can control two open-close circuits with one open-close plate.

To achieve the object described above, a damper apparatus for a refrigerator in accordance with one embodiment of the present invention may include a single damper open/close plate that opens and closes two duct opening sections, respectively. In one embodiment of the present invention, a damper apparatus has one single open/close plate with two faces. The two faces of the one single open/close plate are provided to face two duct opening sections that are branched from one duct, wherein each of the two faces of the open/close plate opens and closes each of the corresponding opening sections that face the respective two faces of the open/close plate.

In one embodiment, the branched two duct opening sections may be controlled to open and close by the damper open/close plate in three modes is including an open-open mode, an open-close mode and a close-open mode. In the open—open mode, both of the two duct opening sections are opened. In the open-close mode, one of the two opening sections (i.e., a first opening section) is opened, and the other (i.e., a second opening section) is closed. In the close-open mode, one of the two opening sections (i.e., a first opening section) is closed, and the other (i.e., a second opening section) is opened. Moreover, the branched two duct opening sections define opening plane sections that abut against the damper open/close plate, the opening plane sections transverse each other at an angle within 90°, and the damper open/close plate is rotatable through an angle within 90°. As a result, the damper apparatus can be made compact, such that it is readily installed inside the refrigerator, and the duct can be more reasonably installed. In addition, the operation distance of the damper open/close plate is short, and therefore the time to shift from one mode to the other becomes shorter. This improves the sensitivity of the damper apparatus, and reduces the power consumption to drive the damper open/close plate.

Also, a refrigerator in accordance with the present invention may include: a forced cooling air circulation duct; a first opening section that introduces cooling air in a specified storage section within the refrigerator; a second opening section that is operated in association with an opening movement of a refrigerator access door to introduce cooling air in a specified storage section within the refrigerator; and a refrigerator damper apparatus having one damper open/close plate with two surfaces, each facing each of the first and second opening sections, that controllably open and close the first and second opening sections, respectively.

Also, the refrigerator damper apparatus may control to open and close the damper open/close plate in three modes including an open—open mode, an open-close mode and a close-open mode, wherein the refrigerator damper apparatus is operated in association with an opening movement of the refrigerator access door to close the first opening section and open the second opening section. Further, the second opening section is provided to communicate with an air curtain apparatus provided adjacent to the refrigerator access door, and the air curtain apparatus operates only when the access door is opened. In this manner, when the first opening section is shut on one hand, the second opening section is always opened on the other hand. Preferably, cooling air that is introduced through the second opening section is also used to cool the lighting apparatus inside the refrigerator that is lit only when the access door is opened.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 1(a) and 1(b) show an example embodiment of a refrigerator in which a refrigerator damper in accordance with the present invention is installed, wherein FIG. 1(a) shows a side view of the refrigerator when its access door is closed, and FIG. 1(b) shows a side view of the refrigerator when its access door is opened.

DESCRIPTION OF PREFERRED EMBODIMENT

Figure 2:
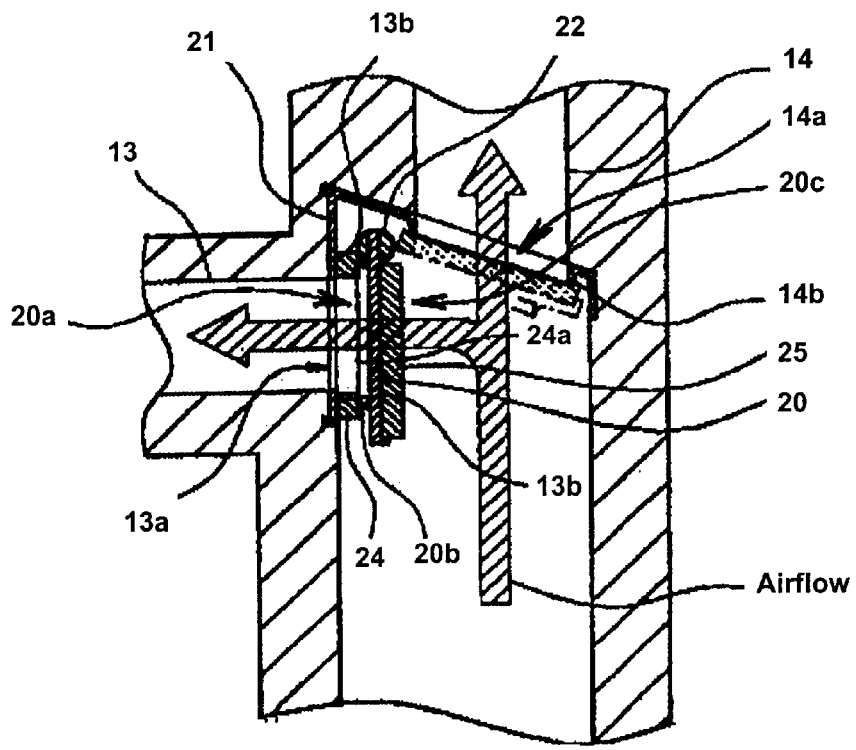
FIG. 2 shows an enlarged cross-sectional view of a section where the refrigerator damper in accordance with the present invention is disposed.

A damper apparatus in accordance with an embodiment of the present invention will be described with reference to the accompanying drawings.

FIGS. 1(a) and 1(b) schematically show cross sections of a refrigerator equipped with a damper apparatus in accordance with one example of the present embodiment. A damper apparatus 10 is disposed adjacent to a branch out section where a cooling duct 13 having a rectangular cross section, which connects a cooler section 11 to a freezer chamber 12, braches out to a bypass duct 14. In the figures, reference numeral 15 denotes an access door, reference numeral 16 denotes a lighting fixture in the refrigerator, and reference number 17 denotes a blower fan that is driven by a motor 18.

Arrows in the figures show flows of air inside the refrigerator. FIG. 1(a) shows flows of air when the access door 15 is closed, in which the damper apparatus 10 operates to open or close a damper open/close plate 20 upon receiving signals from a microcomputer (not shown) that are provided in association with changes in the temperature inside the refrigerator, to thereby continue or stop the flow of air to the freezer chamber 12 to thereby control the temperature inside the refrigerator. FIG. 1(b) shows flows of air when the access door 15 is opened. When the access door 15 is opened, the damper apparatus 10 immediately shuts the passage to the freezer chamber 12, and opens the bypass duct 14 to flow air that forms an air curtain.

A first opening section 13a and a second opening section 14a that divide the flow of air into two flows are formed at a damper frame 21 which defines a face that closes and another face that opens when the access door 15 is opened. Two faces of the single damper open/close plate 20 are formed to match the shapes and measurements of the opening sections 13a and 14a, and control the two flows of cooling air in the cooling duct 13 and the bypass duct 14 (see FIG. 2).

FIG. 2 is a partially enlarged cross-sectional view of a section where the damper apparatus 10 is provided. Normally, the damper apparatus 10 controllably opens or closes the first opening section 13a that communicates with the cooling section 11 in order to control the temperature inside the freezer chamber 12. More specifically, the temperature inside the freezer chamber 12 within the refrigerator R is always monitored by a sensor (not shown). When the detected temperature becomes lower than a microcomputer's set value, the damper apparatus 10 is energized such that the damper open/close plate 20 closes the first opening section 13a. The energization is stopped at a position at a damper closed position where the damper open/close plate 20 completely closes the first opening section 13a. Conversely, when the temperature inside the freezer chamber rises and exceeds the microcomputer's set value, the damper apparatus 10 is energized again, such that the damper open/close plate 20 rotates and opens the opening section 13a, and the energization is stopped when the opening section 13a is completely opened. The damper open/close plate 20 may be rotated in small amounts about an intermediate position between the completely opened position and the completely closed position to control the amount of flow of air to thereby control the temperature inside the freezer chamber. This operation may be controlled by the microcomputer in response to temperatures detected by the sensor in the freezer chamber 12.

Figure 3:
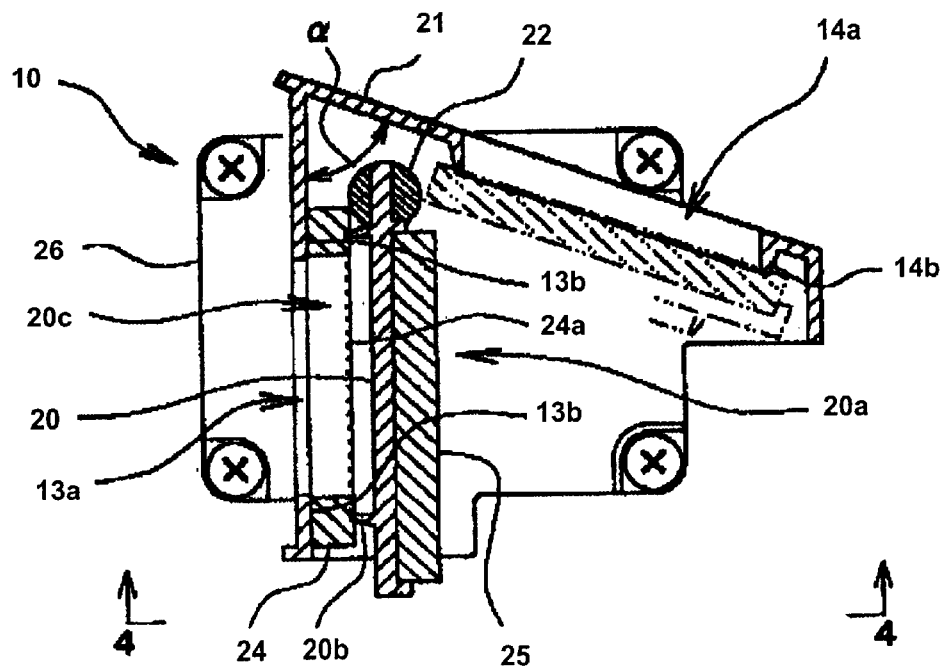
FIG. 3 shows an enlarged cross sectional view taken along lines 3—3 of a side view of the refrigerator damper in accordance with the present invention shown in FIG. 4.
Figure 4:
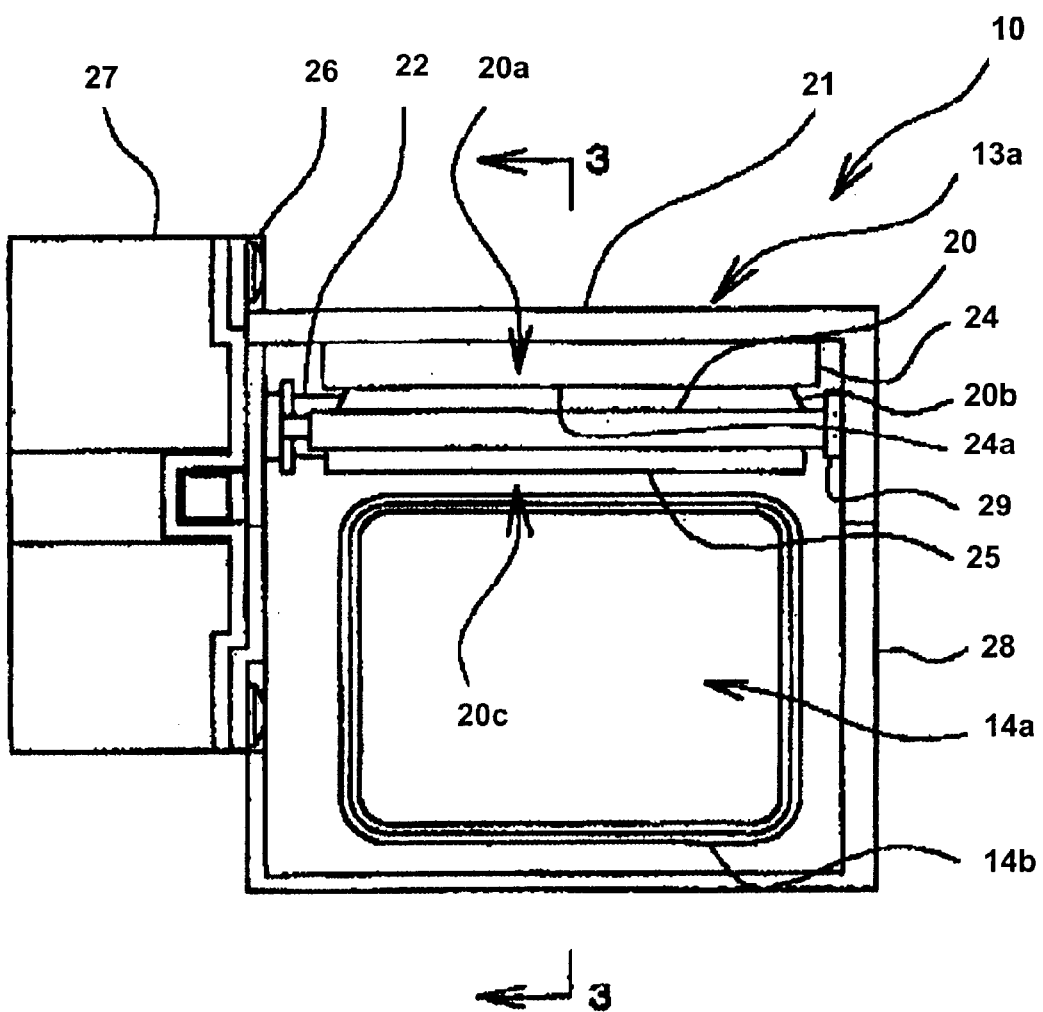
FIG. 4 shows a side view taken along lines 4—4 of the refrigerator damper in accordance with the present invention shown in FIG. 3.

FIG. 3 is a cross-sectional view taken along lines 3—3 of the damper apparatus 10 shown in FIG. 4. One end edge of the damper open/close plate 20, which defines a rotational center thereof, is formed in one piece with a driving shaft 22 that is freely, rotatably supported by a bearing 29 disposed on an inner surface of a side wall 28 of the damper frame 28. (See FIG. 4). A step motor (not shown) for rotating the driving shaft 22 by a specified rotational angle is affixed to a motor mounting stage 26 that is connected to the damper frame 21. The step motor is installed inside a motor case 27, and a motor power output shaft of the step motor is connected to the driving shaft 22. FIGS. 2 and 3 show a state in solid lines in which the damper open/close plate 20 closes the first opening section 13a formed in one of the frame members that are formed as part of the damper frame 21, and a state in dotand-dash lines in which the damper open/close plate 20 close the second opening section 14a formed in the other of the frame members that are formed as part of the damper frame 21. The driving shaft 22 is mounted adjacent to an intersection where the two frame members that are formed as part of the damper frame 21 cross one another, and inside the damper frame 21. It is noted that arrows indicate flows of air (airflows).

Furthermore, when the access door 15 of the refrigerator is opened, the damper open/close plate 20 closes the first opening section 13a to stop the airflow through the first opening section 13a in order to prevent frosting on the inside of the cooling section 11. At this moment, the second opening section 14a necessarily opens. The first opening section 13a and the second opening section 14a may preferably open with respect to one another at an opening angle $\alpha$ of less than 90°. In the present embodiment, the relative opening angle $\alpha$ is set at about 70°, such that the moving distance of the damper open/close plate 20 is relatively small, and the response of the damper open/close plate 20 is quicker. Moreover, the power consumption to driver the damper open/close plate 20 can be reduced.

It is noted that the damper apparatus of the present embodiment is equipped with a system that forms airflow 19 to create an air curtain of cooling air over an area of the access door 15 of the refrigerator R (see FIG. 1 (b)) to suppress temperature increase in the refrigerator R, and cooling air needs to be transferred when the access door 15 is opened. Moreover, since heat of the lighting fixture 16 inside the refrigerator, which turns on when the access door 15 is opened, may increase the temperature inside the refrigerator, the temperature increase needs to be suppressed by cooling air.

The damper apparatus 10 in accordance with the present invention shown in FIGS. 2–4 may include a control opening for passing cooling air that is required only when the damper is closed in addition to a main control opening. In the present embodiment, when the first opening section 13a is closed by one surface of the damper open/close plate 20, the second opening section 14a is opened by another surface of the damper open/close plate 20, such that the cooling is performed by an independent cooling air circuit (i.e., an independent cooling air passage). Even when the access door 15 is closed, the damper open/close plate 20 may be controlled in the course of temperature regulation to half-open the first opening section 13a. In this instance, the second opening section 14a is necessarily also half-opened, and the cooling air also flows toward the access door 15. However, this does not hinder the temperature adjustment function of the refrigerator R to maintain the interior of the refrigerator at low temperatures.

FIG. 4 is a side view taken along lines 4—4 of FIG. 3. Referring to FIGS. 3 and 4, an independent foam sealing member 24 in a rectangular shape is provided at the first opening section 13a to surround its outer periphery of the rectangular opening that matches the duct having the rectangular cross section. The independent foam sealing member 24 is attached (for example, glued) to an outer peripheral section 13b of the first opening section 13a provided in the damper frame 21. On the other hand, a protrusion 20b is provided on a first face side 20a of the damper open/close plate 20. The protrusion 20b sinks deep in a face 24a of the sealing member 24 to improve the air-tightness, when the damper open/close plate 20 closes the first opening section 13a. Also, an independent foam sealing member 25 is attached to an opposite second face side 20c of the damper open/close plate 20 that faces the second opening section 14a. A protrusion 14b is provided on the damper frame 21 along an outer periphery of the second opening section 14a. The protrusion 14b sinks deep in the foam sealing member 25 to provide the air-tightness, when the damper open/close plate 20 closes the second opening section 14a.

As described above, the damper for a refrigerator in accordance with the present invention functions as a switching damper that is operated in association with an opening movement of the access door, which opens one of the two ducts and closes the other. This damper operation closes one of the ducts provided on the side in which opening of the access door may directly affect the temperature and humidity inside the refrigerator such that external disturbances are shut out. However, on the other hand, when the access door is closed, the damper can be functioned as a controlling damper to adjust changes in the temperature in analogue form if the environment communicating with the other duct meets the conditions that are not affected by opening and closing the damper.

The damper for a refrigerator and the refrigerator that uses the damper in accordance with the embodiment of the present invention are described above. However, the present invention is not limited to the embodiment, and many modifications can be made. For example, to simplify the forming molds for the damper frame 21 and the damper open/close plate 20, a sealing members 24 may be attached at an outer peripheral portion of each of the opening sections 13a and 14a of the damper frame 21, and a protrusion 20b may be provided on each of the face sides 20a and 20c of the damper open/close plate 20.

Also, sealing members 25 may be attached to both of the face sides 20a and 20c of the damper open/close plate 20, and a protrusion similar to the protrusion 14a may also be provided at the outer peripheral section of the opening section 13a. Furthermore, in the present embodiment, the first and second opening sections 13a and 14a define an open angle of about 70° in view of the driving internal structure. However, the first and second opening sections 13a and 14a may be set at a different open angle.

As is clear from the forgoing description, a damper for a refrigerator and a refrigerator that uses the damper in accordance with the present invention achieves the control, which may normally require two dumpers, with a single damper, and saves the installation space. As a result, the degree of freedom in designing the structure is improved, the temperature increase inside the refrigerator is restricted, and therefore the power consumption is reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A damper apparatus in combination with a refrigerator, comprising:

a first duct opening section that introduces cooling air in a first specified storage section within the refrigerator;

a second duct opening section that introduces cooling air to the front side of said specified storage section through a circular duct;

a single damper open/close plate with two faces, each of the faces facing each of the first and second duct opening sections, which controllably open and close the first and second duct opening sections, respectively, wherein the refrigerator damper apparatus controls to open and close the damper open/close plate in three modes including an open-open mode, an open-close mode and a close-open mode, wherein the refrigerator damper apparatus is operated in association with an opening movement of the refrigerator access door to close the first opening section and open the second opening section.

2. A damper apparatus according to claim 1, further comprising a branched section having two frame members that define the first opening section and the second opening section, respectively, wherein the damper open/close plate is provided adjacent to the first and second opening sections that are formed in the respective two frame members of the branched section, and each of the two faces of the damper open/close plate opens and closes each of the two duct opening sections.

3. A damper apparatus according to claim 1, wherein the two frame members of the branched section define abutting plan s that are brought in contact with the two faces of the damper open/close plate, respectively, the abutting planes intersect with each other at an angle less than 90°.

4. A damper apparatus according to claim 1, wherein the damper open/close plate is rotatable, and when one of the two faces of the damper open/close plate is in contact with one of the abutting planes, the other of the two faces of the damper open/close plate is separated from the other of the abutting planes.

5. A refrigerator comprising:
   a forced cooling air circulation duct;
   a first opening section that introduces cooling air in first specified storage section within the refrigerator;
   a second opening section that is operational in association with an opening movement of a refrigerator access door to introduce cooling air in a second specified storage section within the refrigerator; and
   a refrigerator damper apparatus having a single damper open/close plate with two faces, each of the faces facing each of the first and second opening sections, that controllably open and close the first and second opening sections, respectively, wherein the refrigerator damper apparatus controls to open and close the damper open/close plate in three modes including an open-open mode, an open-close mode and a close-open mode, wherein the refrigerator damper apparatus is operated in association with an opening movement of the refrigerator access door to close the first opening section and open the second opening section.

6. A refrigerator according to claim 5, wherein the second opening section communicates with an air curtain apparatus provided adjacent to the refrigerator access door.

7. A refrigerator according to claim 5, wherein the damper open/close plate is provided adjacent to the two duct opening sections that are branched from one duct, each of the two faces of the damper open close plate opens and closes each of the two duct opening sections.

8. A refrigerator according to claim 7, wherein the two duct opening sections define opening plane sections that abut against he damper open close plate, the opening plane sections intersect each other at angle within 90°, and the damper open/close plate is rotatable through an angle within 90°.

9. A refrigerator according to claim 7, wherein the damper apparatus further comprises a damper frame having a side wall, he damper frame including two frame sections in which the two duct opening sections are formed, wherein the damper open/close plate is affixed to a driving shaft that is freely rotatably supported by a pivot on the side wall of the damper frame.

10. A damper apparatus according to claim 9, wherein the driving shaft is disposed adjacent to and inside an intersection of the two frame sections in which the two duct opening sections are formed respectively.

11. A refrigerator comprising:
   a first opening section that introduces cooling air in specified storage section within the refrigerator;
   a second opening section that introduces cooling air o the front side of said specified storage section through a circulation duct;
   a refrigerator damper apparatus having a single damper open/close plate with two faces, each of the faces facing each of the first and second opening sections, that controllably open and close the first and second opening sections, respectively, wherein the refrigerator damper apparatus controls to open and close the damper open/close plate in three modes including an open-open mode, an open-close mode and a close-open mode, wherein the refrigerator damper apparatus is operated in association with an opening movement of the refrigerator access door to close the first opening section and open the second opening section.

12. A refrigerator according to claim 11, wherein the damper open/close plate is provided adjacent to the two duct opening sections that are branched from one duct, each of the two faces of the damper open/close plate opens and closes each of the two duct opening sections.

13. A refrigerator according to claim 12, wherein the two duct opening sections define opening plane sections that abut against the damper open close plate, the opening plane sections intersect each other at angle within 90°, and the damper open/close plate is rotatable through an angle within 90°.

14. A refrigerator according to claim 12, wherein the damper apparatus further comprises a damper frame having a side wall, the damper frame including two frame sections in which the two duct opening sections are formed, wherein the damper open/close plate is affixed to a driving shaft at is freely rotatably supported by a pivot on the side wall of the damper frame.

15. A damper apparatus according to claim 14, wherein the driving shaft is disposed adjacent to and inside an intersection of the two frame sections in which the two duct opening sections are formed respectively.

* * * * *